US012432503B1

(12) United States Patent
Persson et al.

(10) Patent No.: US 12,432,503 B1
(45) Date of Patent: Sep. 30, 2025

(54) FABRIC SPEAKERS

(71) Applicant: Apple Inc., Cupertino, CA (US)

(72) Inventors: Per Haakan Linus Persson, San Francisco, CA (US); Claire Puginier, San Francisco, CA (US); Bart K Andre, Palo Alto, CA (US); Geng Luo, Santa Clara, CA (US); Onur I Ilkorur, Santa Clara, CA (US); Kristen L Cretella, San Francisco, CA (US); Megan A McClain, Napa, CA (US); Benjamin A Shaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 18/446,252

(22) Filed: Aug. 8, 2023

Related U.S. Application Data

(60) Provisional application No. 63/405,106, filed on Sep. 9, 2022.

(51) Int. Cl.
*H04R 9/06* (2006.01)
*B32B 5/02* (2006.01)
*B32B 5/06* (2006.01)
*B32B 5/26* (2006.01)
*B32B 9/02* (2006.01)
*B32B 9/04* (2006.01)
*H04R 9/02* (2006.01)

(52) U.S. Cl.
CPC ............... *H04R 9/06* (2013.01); *B32B 5/024* (2013.01); *B32B 5/026* (2013.01); *B32B 5/073* (2021.05); *B32B 5/26* (2013.01); *B32B 9/025* (2013.01); *B32B 9/047* (2013.01); *H04R 9/025* (2013.01); *B32B 2307/202* (2013.01); *B32B 2307/208* (2013.01); *B32B 2457/00* (2013.01)

(58) Field of Classification Search
CPC .......... H04R 9/06; H04R 9/025; B32B 5/073; B32B 5/024; B32B 5/026; B32B 9/025; B32B 9/047; B32B 2307/202; B32B 2307/208; B32B 2457/00
USPC ....................................................... 381/333
See application file for complete search history.

(56) References Cited

U.S. PATENT DOCUMENTS

| | | | |
|---|---|---|---|
| 7,266,204 B2 * | 9/2007 | Watson | H04M 1/6091 381/345 |
| 9,924,271 B2 | 3/2018 | Lai et al. | |
| 10,212,519 B2 | 2/2019 | Nelson et al. | |
| 2007/0190881 A1 | 8/2007 | Shibaoka et al. | |

(Continued)

FOREIGN PATENT DOCUMENTS

CN 102334346 A * 1/2012 ............. H04R 9/047

*Primary Examiner* — Sean H Nguyen
(74) *Attorney, Agent, or Firm* — Treyz Law Group, P.C.; Tianyi He

(57) ABSTRACT

An electronic device may include a speaker having fabric portions. The fabric-based speaker may have one or more fabric support layers on which other speaker components are disposed. In particular, the fabric-based speaker may include one or more conductive patterns and one or more magnetic structures. The one or more conductive patterns may be coupled to one or more fabric support layers and may receive electric signals that actuate the one or more fabric support layers in the presence of magnetic field created by the one or more magnetic structures to produce sounds waves.

20 Claims, 12 Drawing Sheets

(56) References Cited

U.S. PATENT DOCUMENTS

2015/0195655 A1* 7/2015 Fan .................. H04R 9/027
   381/400
2020/0154184 A1   5/2020 Wu et al.

* cited by examiner

FABRIC SPEAKERS

This application claims the benefit of U.S. provisional patent application No. 63/405,106, filed Sep. 9, 2022, which is incorporated by reference herein in its entirety.

FIELD

This relates generally to electronic devices, and more particularly, to electronic devices having speakers.

BACKGROUND

Electronic devices may have speakers for presenting audio to a user. It may be desirable to incorporate fabric into electronic device components. Fabric-based items such as these may have an attractive appearance and may benefit from desirable attributes associated with fabric such as sound permeability, light weight, and durability.

SUMMARY

An electronic device may include one or more speakers. The speaker(s) can include fabric components. A fabric-based speaker may have one or more fabric support layers on which other speaker components are disposed. In particular, the fabric-based speaker may include one or more conductive patterns and one or more magnetic structures. The one or more conductive patterns may be coupled to one or more fabric support layers and may receive electric signals that actuate the one or more fabric support layers in the presence of the magnetic field created by one or more magnetic structures to produce sounds waves.

In some arrangements, a conductive pattern such as a coil pattern or a serpentine pattern may be formed on a first fabric support layer. A magnetic structure such as a permanent magnet may be formed on a second fabric support layer parallel to the first fabric support layer. The magnetic structure may overlap the conductive pattern. The conductive pattern and/or the magnetic structure may be incorporated into the fabric support layer during fabric formation (e.g., the knitting process, the weaving process, etc.), may be inserted into the fabric support structure after fabric formation, and/or may be attached via adhesive or other attachment mechanisms.

In some arrangements, conductive patterns and magnetic structure may be formed in a coplanar manner within the same fabric support layer. Configured in this manner, portions of the fabric support layer having the conductive patterns may buckle and vibrate to produce sound waves while portions of the fabric support layer having the magnetic structures remain still.

In some arrangements, one or more fabric support layers may form a three-dimensional fabric support structure on which conductive patterns are disposed. The three-dimensional fabric support structure having the conductive patterns may surround one or more magnetic structures. If desired, multiple fabric support layers may be tied or threaded together using one or more conductive strands of material that collectively form a conductive pattern. The one or more conductive strands of material may be tightened to compress the multiple fabric support layers into a compact three-dimension structure that encloses one or more magnetic structures.

DETAILED DESCRIPTION

Electronic devices such as headphone devices and stand-alone (voice-controlled) speaker devices may be used to play audio for a user. As an example, earbuds (in-ear headphones) or over-ear headphones may receive music tracks and other media that includes audio data via wired or wireless connections to external equipment. These headphone devices may contain speakers for playing corresponding audio for the user.

Figure 1:
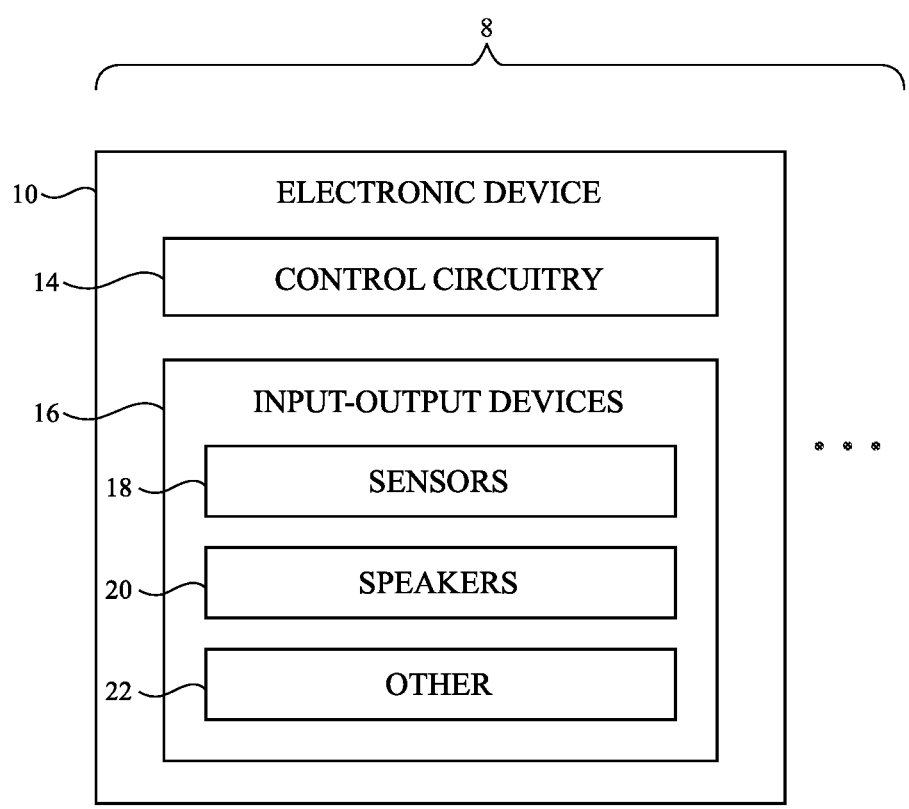
FIG. 1 is a schematic diagram of an illustrative system with an electronic device in accordance with some embodiments.

FIG. 1 is a schematic diagram of an illustrative electronic device such as device 10 containing one or more speakers operating within a system such as system 8. System 8 may include multiple electronic devices 10 that may operate with one another. For example, one device 10 may generate and convey audio data to one or more other devices 10 that play or broadcast audio on one or more channels for the user.

Electronic device 10 may be an electronic device such as a headphone device such as an over-ear headphone or an in-ear headphone (earbud), or other earpiece device, a voice-controlled electronic device or voice-controlled speaker, a laptop computer, a computer monitor containing an embedded computer, a tablet computer, a cellular telephone, a media player, or other handheld or portable electronic device, a smaller device such as a wristwatch device, a pendant device, a device embedded in eyeglasses or other equipment worn on a user's head, or other wearable or miniature device, a television, a computer display that does not contain an embedded computer, a gaming device, a navigation device, an embedded system such as a system in which device 10 is mounted in a kiosk, in an automobile, airplane, or other vehicle, other electronic equipment, or equipment that implements the functionality of two or more of these devices. If desired, device 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, shirt, pants, shoes, etc.), or may be any other suitable electronic device.

As shown in FIG. 1, device 10 may include control circuitry 14 and input-output devices 16. Control circuitry 14 may include microprocessors, microcontrollers, application-specific integrated-circuits, digital signal processors, baseband processors, and/or other controllers and may include storage such as random-access memory, read-only memory, solid state drives, and/or other storage and processing circuitry. If desired, wireless communication circuitry (e.g., cellular telephone communication circuitry, wireless local area network communication circuitry such as Wi-Fi® circuitry, personal area network communication circuitry such as Bluetooth® circuitry, etc.) may be included in control circuitry 14 and may be used to support wireless communications with external equipment or other devices in system 8.

Control circuitry 14 may gather information such as sensor data and/or (user or environmental) input from sensors 18 and other circuitry in input-output devices 16 and may use input-output devices 16 to supply output. Input-output devices 16 may, for example, include audio devices such as speakers 20. Speakers 20 can produce audio output (e.g., sound such as music, synthesized voice, tones, etc.). For example, speaker 20 may be used to produce audio output (sound) through an audio port (e.g., an opening or an array of openings in the housing of device 10).

Device 10 may have one or more sensors 18. Illustrative sensors 18 that may be included in device 10 include touch sensors, force sensors, capacitive sensors, optical sensors, proximity sensors, strain gauges, temperature sensors, moisture sensors, gas sensors pressure sensors, magnetic sensors, position and orientation sensors (e.g., accelerometers, gyroscopes, and/or compasses), heart rate sensors such as photoplethysmography (PPG) sensors and other medical sensors, microphones for gathering voice commands and other audio input, and/or other sensors.

In one illustrative arrangement, sensors 18 may include capacitive sensors such as capacitive sensors configured to detect touch and/or force input, optical proximity sensors, and/or other sensors. These sensors may be used to sense contact with the housing of device 10 by the ear of a user and/or by a user's finger or other body part. If desired, sensors 18 in device 10 may serve as ear-presence sensors that can detect when device 10 has been inserted into the ear of a user or is being worn on the ear of a user and/or can serve as force sensors and/or touch sensors that detect when a user has touched the housing of device 10 with the user's fingers. If desired, device 10 may include position sensors (e.g., an inertial measurement unit or other sensor that detects device orientation relative to the Earth's gravity, motion, etc.) and accelerometers can be used to detect user tap input (e.g., by measuring vibrations due to user finger taps on the device housing).

If desired, device 10 may include other input-output devices 22 such as light-emitting diodes, displays, and other visual output devices may be used in supply visual output to a user. Buttons, joysticks, haptic output components, and/or other input-output components may be provided in input-output devices 22 to gather input from a user and/or to provide a user with output.

If desired, device 10 may also include an optional battery or other energy storage structure, connector ports for supporting wired communications with ancillary equipment and for receiving wired power, circuitry for receiving wireless power signals, and/or other circuitry.

Device 10 may include illustrative fabric having intertwined strands of material. Structural portions of device 10 such as housing structures, wristbands, headbands, other wearable components, housing walls that serve as covering layers, and other portions of device 10 may be formed from fabric. Accordingly, in these configurations, device 10 may sometimes be referred to herein as a fabric-based item or fabric-based electronic device. Fabric may form all or part of a housing wall or other layer in device 10, may form internal structures in electronic device 10, or may form other fabric-based structures. Device 10 may be soft (e.g., may have a fabric exterior and/or interior surface that yields to a light touch), may have a rigid feel (e.g., the exterior and/or interior surface of device 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

Configurations in which one or more speakers 20 include fabric are described herein as illustrative examples. In particular, to provide an attractive appearance and benefit from desirable attributes associated with fabric such as light weight, breathability, etc., speaker 20 may include fabric.

Figure 2:
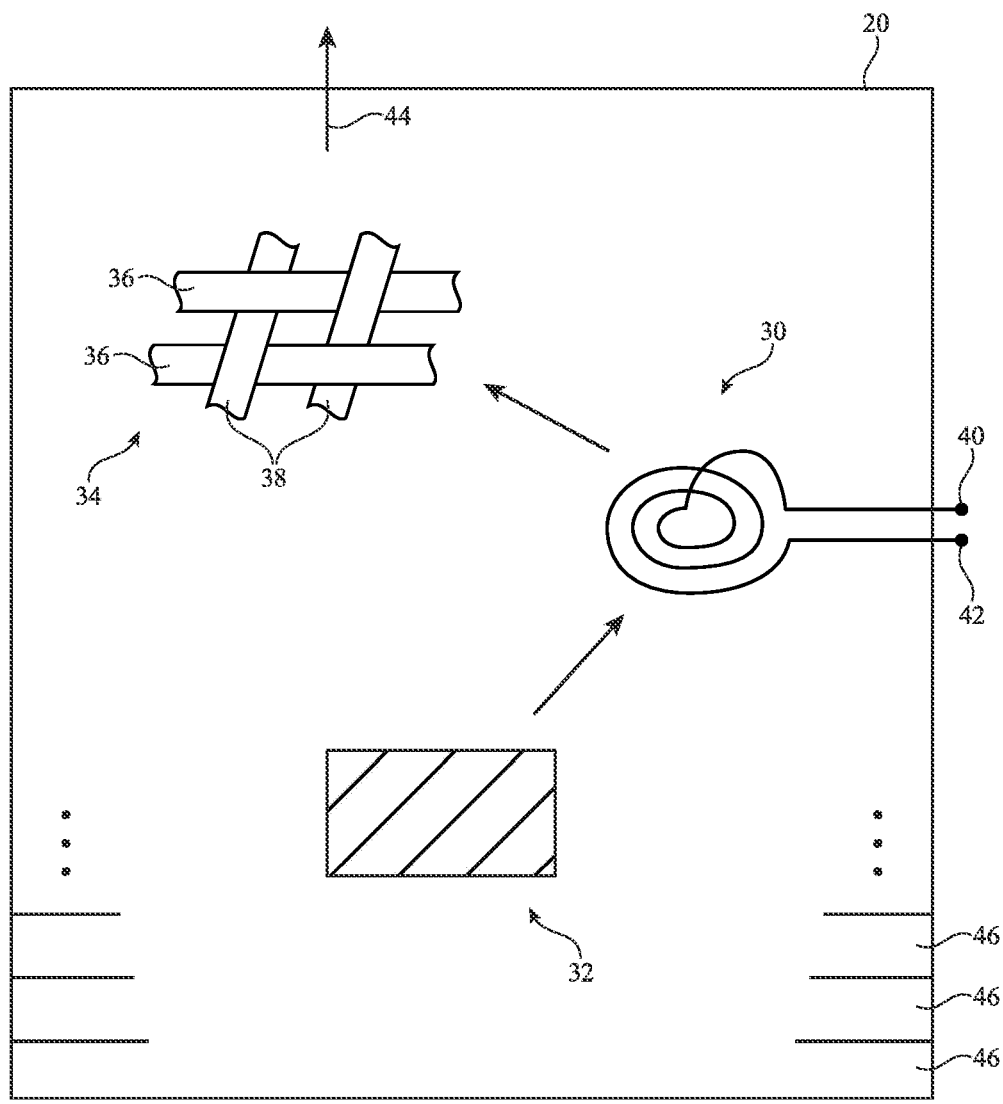
FIG. 2 is a schematic diagram of an illustrative speaker having fabric portions in accordance with some embodiments.

FIG. 2 is a schematic diagram of an illustrative speaker having fabric structures. With the inclusion of fabric, speaker 20 may sometimes be referred to herein as a fabric-based speaker or fabric speaker. As shown in FIG. 2, speaker 20 may include an electrically conductive structure such as conductive structure 30 configured to receive electrical audio signals. As an example, conductive structure may include a conductive coil (sometimes referred to as a voice coil) or other conductive patterns. Speaker 20 may also include one or more magnetic structures such as magnetic structure 32 (e.g., a permanent magnet configured to provide a persistent magnetic field). Conductive structure 30 serving as an electromagnet may be disposed in close proximity to magnetic structure 32. As such, when applying (audio) voltage signals at terminals 40 and 42 of conductive structure 30, an electrical current may flow through conductive structure 30. The current flow in the presence of the magnetic field created by magnetic structure 32 may cause movement of conductive structure 30 relative to magnetic structure 32 based on a magnetic force. Terminals 40 and 42 may be connected to an audio signal source or generator (e.g., control circuitry 14) through one or more amplifiers and/or other intervening signal processing circuitry.

Conductive structure 30 and/or magnetic structure 32 may be disposed on fabric 34. In particular, conductive structure 30 and at least a portion of fabric 34 may be closely intertwined such as that movement of conductive structure 30 (caused by the magnetic force) also causes corresponding movement of the fabric portion. In other words, movement of conductive structure 30 may carry the fabric portion due to their physical inter-coupling. The movement (e.g., vibrations) of the fabric portion may displace air and cause pressure waves or sound waves, thereby providing output 44 for speaker 20. In such manner, electrical signals (corresponding to audio media) received at terminals 40 and 42 are converted into sound (acoustic) waves as output 44.

Fabric 34 may form structural portions of speaker 20 such as speaker housing structures, and/or internal speaker layers that support speaker components (e.g., conductive structure 30 such as a conductive coil, magnetic structure 30 such as a permanent magnet, etc.), may form speaker housing walls that serve as covering layers, and/or may form other fabric-based portions of speaker 20. Fabric 34 may be soft (e.g., speaker 20 may have a fabric exterior and/or interior surface that yields to a light touch), may have a rigid feel (e.g., the exterior and/or interior surface of speaker 20 may be formed from a stiff fabric), may be coarse, may be smooth, may have ribs or other patterned textures, and/or may be formed as part of a speaker that has portions formed from non-fabric structures of plastic, metal, glass, crystalline materials, ceramics, or other materials.

Fabric 34 may include intertwined strands of material such as strands 36 and 38. The strands of material in fabric 34 may be single-filament strands (sometimes referred to as fibers or monofilaments), may be yarns or other strands that have been formed by intertwining multiple filaments (multiple monofilaments) of material together, or may be other types of strands (e.g., tubing). The strands may include extruded strands such as extruded monofilaments and yarn formed from multiple extruded monofilaments. Monofilaments for fabric 34 may include polymer monofilaments and/or other insulating monofilaments and/or may include bare wires and/or insulated wires. Monofilaments formed from polymer cores with metal coatings and monofilaments formed from three or more layers (cores, intermediate layers, and one or more outer layers each of which may be insulating and/or conductive) may also be used. Fabric 34 may include natural materials (e.g., cotton or wool) and conductive material (e.g., metal).

If desired, fabric 34 may include layers of compressed, processed, and/or natural materials (e.g., may include layers of suede, felt, leather, etc.).

Fabric 34 may also include polymer or other binder to hold strands such as strands 36 and 38 in fabric 34 and/or layers of suede, felt, leather, etc., together. Magnetic particles (e.g., particles of iron, ferrite, etc.) or other magnetic filler material may be incorporated into the binder, if desired, to provide regions of fabric 34 with magnetic properties. In some arrangements, strands may be fused together by application of heat and/or pressure. Adhesive or other attachment mechanisms may be used to attach fabric 34 to support structures such as frame members, housing structures, and other mechanical structures of speaker 20.

In illustrative configurations described herein as examples, speaker 20 may include one or more support layers 46 on which various components such as one or more conductive structures 30 and magnetic structures 32 are disposed. A support layer 46 may be formed from one of or combinations of multiple materials such as intertwined strands (strands 36 and 38) of natural materials (e.g., cotton or wool), layers of suede, felt, leather, etc., metal, glass, and/or polymer (e.g., adhesive). As an example, one or more support layers 46 may be a fabric layer that includes knit or woven fabric with intertwined strands of material, braided materials, felt, suede, leather and/or other materials. Conductive and/or magnetic materials may be attached to and/or otherwise incorporated into support layer 46, thereby providing conductive structure 32 and/or magnetic structure 30 on one or more support layers 46. If desired, one or more support layers 46 may be formed from non-fabric structures such as (flexible) layers formed from plastic or other polymers, metal, glass, crystalline materials, ceramics, or other materials. In arrangements in which a support layer 46 includes at least some fabric material and/or structures, the support layer 46 may be referred to as a fabric support layer or fabric layer.

Figure 3:
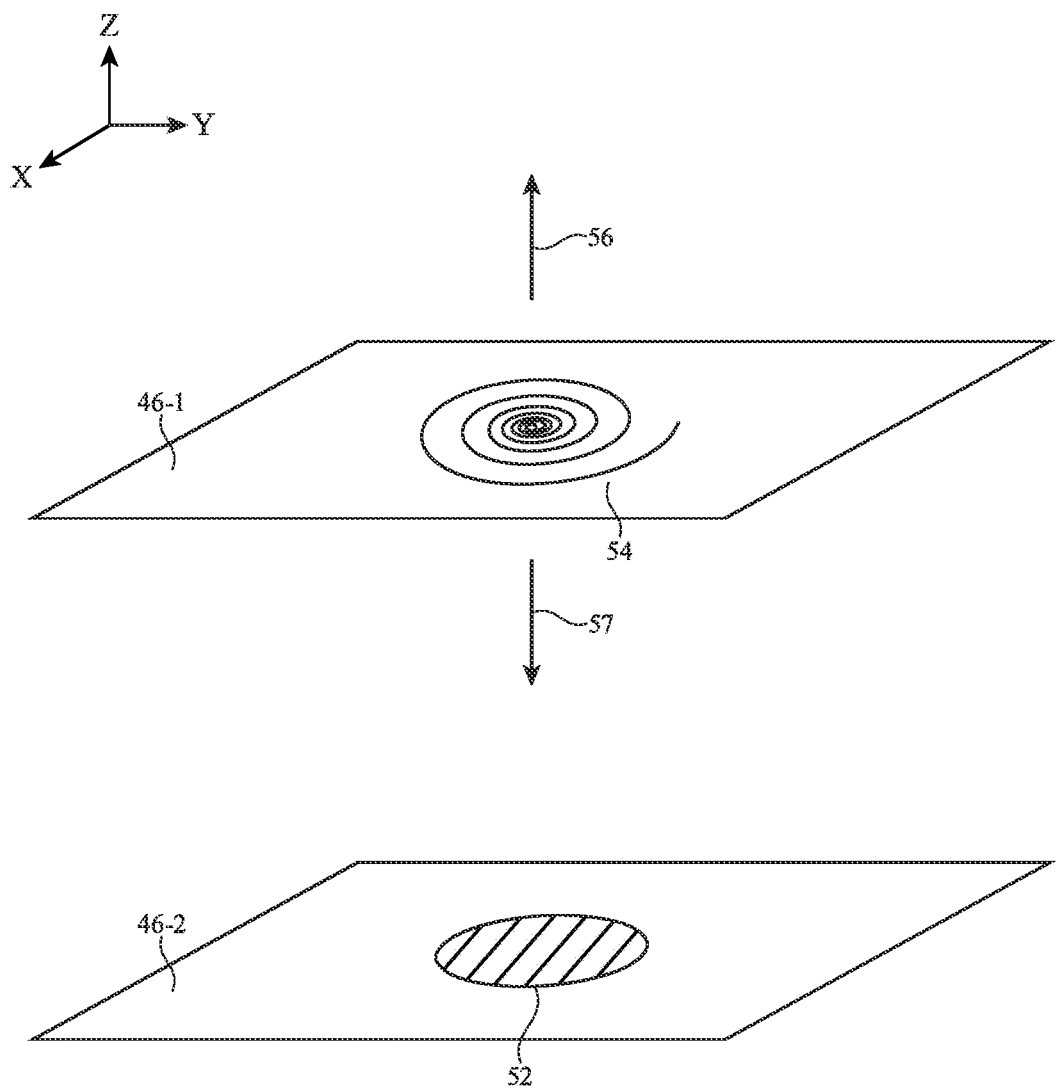
FIG. 3 is an exploded view of an illustrative speaker having fabric layers with a conductive coil pattern and a magnetic structure in accordance with some embodiments.

FIG. 3 is an exploded view of an illustrative speaker such as speaker 20 having conductive and magnetic structures formed on respective support layers. As shown in FIG. 3, a conductive coil such as coil 54 may be provide on a first (fabric) support layer 46-1. Coil 54 may be a planar coil (parallel to the plane of layer 46-1) that winds around a central axis. Coil 54 may have first and second voltage terminals (terminals 40 and 42 in FIG. 2) at its opposing ends for receive electrical (audio) signals to be converted into audio output 44 for speaker 20.

A magnetic structure such as permanent magnet 52 may be provided on a second (fabric) support layer 46-2 that is parallel to support layer 46-1. In other words, magnetic structure 52 may be supported by support layer 46-2. Magnet 52 may overlap coil 54 and exhibit a persistent magnetic field that affects coil 54 when an electrical current flows through coil 54. Interaction between magnet 52 and coil 54 serving as an electromagnet may cause movement of coil 54 in upward and downward directions 56 and 57 and/or in lateral directions. The movement of coil 54 may carry portions of support layer 46-1 to move in the same manner (e.g., in the same directions) as coil 54. Support layer 46-1 can be a semi-rigid structure that moves (e.g., vibrates) against the air, thereby creating sound waves for speaker audio output.

While a planar and circular coil pattern is shown in FIG. 3 to exemplify one possible configuration for conductive structure 30, this is merely illustrative. If desired, conductive structure 30 may be implemented using other suitable patterns that are not planar (e.g., a pattern that extends along the z-dimension), that are not circular in outline (e.g., a rectangular coil pattern) and/or are not in a coil pattern (e.g., a meandering pattern, a pattern with linear segments, etc.). Accordingly, structures 30 and 54 may sometimes be referred to herein as conductive structures or conductive patterns.

While FIG. 3 shows a gap between support layers 46-1 and 46-2, this is merely illustrative. When assembled, support layer 46-1 and 46-2 may lie directly on top of one another and/or may have portions affixed to each other and/or to other structures in speaker 20 (e.g., housing structures, an exterior fabric cover layer, etc.).

Figure 4:
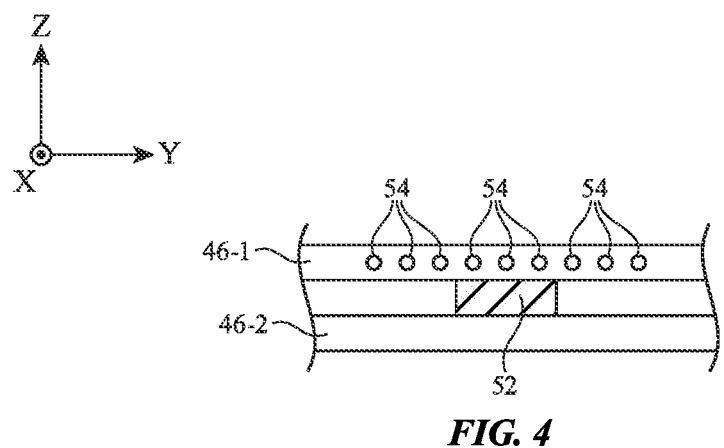
FIG. 4 is a cross-sectional side view of an illustrative conductive pattern formed within a fabric layer in accordance with some embodiments.
Figure 5:
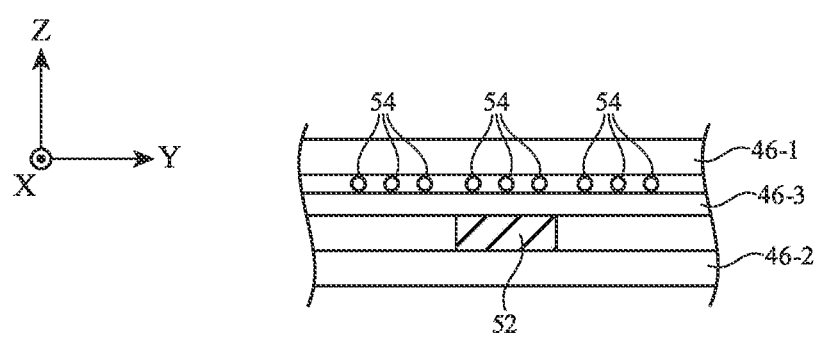
FIG. 5 is a cross-sectional side view of an illustrative conductive pattern disposed between adjacent fabric layers in accordance with some embodiments.

FIGS. 4 and 5 show two illustrative arrangements of conductive pattern 54 relative to one or more support layers 46. As shown in FIG. 4, conductive pattern 54 may be formed within support layer 46-1. In arrangements in which support layer 46-1 is formed from a fabric layer (e.g., a layer of knit fabric, a layer of woven fabric, a layer of suede, felt, leather, or other fabric material), conductive pattern 54 may be formed from intertwining (knitting, weaving, etc.) conductive strands of material and non-conductive strands of material. The conductive strands of material may be bare (or insulated) conductive wires, may be conductive material coated on non-conductive strands of material, or may be formed in other suitable manners.

If desired, one or more openings may be formed within (fabric) support layer 46-1 (e.g., during its fabrication process) and conductive pattern 54 may be inserted into these openings. If desired, openings may be formed in (fabric) support layer 46-1 (e.g., a layer of suede, felt, leather, or other material) and conductive material such as one or more conductive wire or other conductive structures may weave its way through these openings to form conductive pattern 54. Conductive pattern 54 may be incorporated into a fabric layer 46 while the fabric layer is being formed (e.g., during the knitting, weaving, etc.) and/or may be incorporated after the fabric layer is formed. Conductive pattern 54 may be incorporated or integrated into an interior of layer 46-1 in any other manners.

Regardless of the materials and method of incorporation, conductive pattern 54 may be formed within support layer 46-1 in an integral manner such that both move in an interconnected manner. Magnet 52 (e.g., a permanent magnet) may be disposed between support layers 46-1 and 46-2 and may overlap conductive pattern 54. Magnet 52 may be attached to support layers 46-1 and/or 46-2 (e.g., via adhesive or binder and/or other attachment mechanisms).

As shown in FIG. 5, conductive pattern 54 may be interposed between adjacent support layers 46-1 and 46-3, if desired. As examples in this arrangement, conductive pattern 54 may be attached to support layers 46-1 and/or 46-3 via adhesive or other attachment mechanisms, sealed between support layers 46-1 and 46-3 which are fused together by application of heat and/or pressure, or may be formed from coating and patterning conductive material onto the surface of one or more support layers 46-1 and 46-3, etc. Support layers 46-1 and 46-3 may each be formed from fabric layers such as layers of knit fabric, layers of woven fabric, layers of suede, layers of felt, layers of leather, or other materials. Magnet 52 may be disposed between and be attached to support layers 46-3 and overlap conductive pattern 54. Support layers 46-1, 46-2, and 46-3 may extend along parallel planes, and layer 46-3 may be between layers 46-1 and 46-2.

While magnet 52 is shown in the examples of FIGS. 4 and 5 as being on top of support layer 46-2 and/or between adjacent support layers, this is merely illustrative. If desired, magnet 52 may be incorporated into an interior fabric layer 46-2 by being placed within one or more openings with fabric layer 46-2 (e.g., created during the knitting and/or weaving process). If desired, magnetic particles (e.g., particles of iron, ferrite, etc.) or other magnetic filler material may be incorporated into binder within layer 46-2 or into coatings for strands of material forming fabric layer 46-2. These magnetic particles may collectively form magnet 52. If desired, these magnetic particles may be coated on interior and/or exterior surfaces of layer 46-2.

Figure 6:
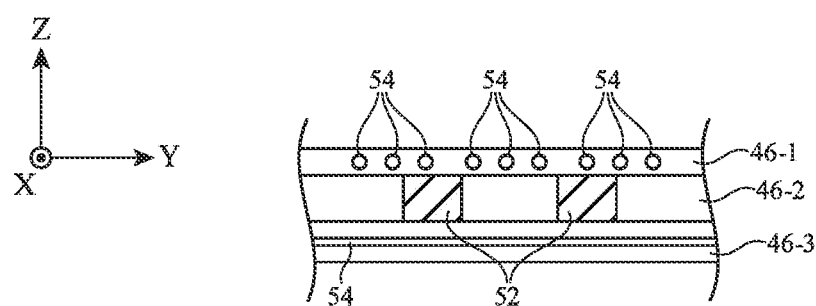
FIG. 6 is a cross-sectional side view of illustrative conductive patterns on opposing sides of magnetic structures in accordance with some embodiments.

FIG. 6 is a diagram of an illustrative speaker arrangement with multiple conductive patterns and multiple magnetic structures. As shown in FIG. 6, a first conductive pattern 54 may be formed within support layer 46-1, while a second conductive pattern 54 may be formed within support layer 46-3. One or more magnetic structures 52 may be interposed between conductive patterns 54 on separate support layers 46-1 and 46-2. In particular, an array of magnets 52 (e.g., arranged in a grid pattern) may be sandwiched between the two conductive patterns. In the example of FIG. 6, magnetic structure(s) 52 are formed within (incorporated into) support layer 46-2. If desired, magnetic structure(s) 52 may be separately attached to support layer 46-2.

The first and second conductive patterns 54 may have the same pattern or different patterns. In the example of FIG. 6, the first conductive pattern 54 in layer 46-1 may include elongated portions extending along the x-dimension, while the second conductive pattern 54 in layer 46-3 may include elongated portions extending along the y-dimension. However, these patterns in FIG. 6 (along with the patterns shown in FIGS. 4 and 5) are merely illustrative. If desired, each of these conductive patterns form a circular coil pattern, a rectangular coil pattern, a serpentine pattern, other patterns formed from a single strand of conductive material, patterns having multiple discontinuous segments of conductive material, etc.

Figure 7:
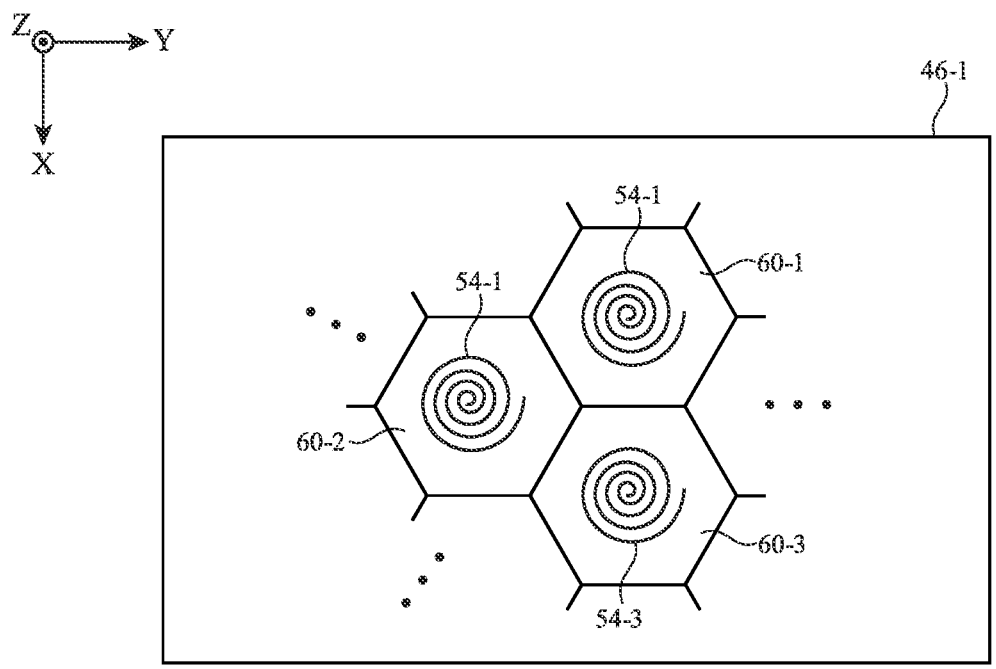
FIGS. 7 and 8 are plan and cross-sectional views of an illustrative speaker having an array of speaker units in accordance with some embodiments.
Figure 8:
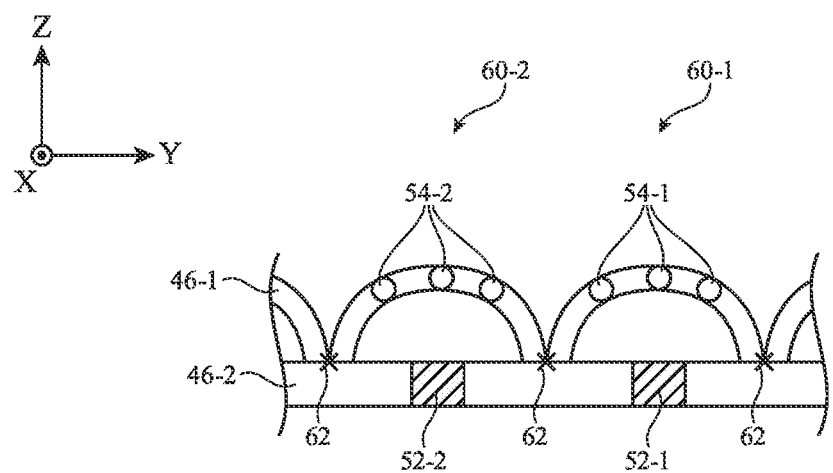

If desired, a speaker such as speaker 20 may include multiple speaker units (e.g., to provide redundancy, to provide differing and/or adjustable speaker sound properties, etc.). FIGS. 7 and 8 show an illustrative speaker with multiple speaker units (e.g., speaker cells). As shown in FIG. 7, (fabric) support layer 46-1 may include multiple conductive patterns 54 each for a corresponding speaker unit 60.

In the example of FIG. 7, three conductive coils 54-1, 54-2, and 54-3 are shown in speaker units 60-1, 60-2, and 60-3, respectively. Speaker units 60-1, 60-2, and 60-3 each span a hexagonal portion of support layer 46-1. Each speaker unit 60 may independently moves (vibrates) to generate sound waves.

The hexagonal shape of speaker units 60 is merely illustrative. If desired, speaker units 60 may have any other suitable shape or outline (e.g., a rectangular shape, a circular shape, etc.).

If desired, each speaker unit 60 may be the same as one or more other speaker units 60 (e.g., having the same conductive pattern 54, having the same shape or dimensions, etc.) or may have different properties than one or more other speaker units 60 (e.g., may have a conductive pattern 54 different than the conductive pattern of another speaker unit 60, may have a different shape than another speaker unit 60, may have one or more dimensions (a size) different than another speaker unit 60, etc.).

As shown in FIG. 8, support layer 46-2 may include a magnetic structure 52 for each speaker unit 60. In the example of FIG. 8, speaker unit 60-1 may include conductive pattern 54-1 within fabric layer 46-1 and may include magnetic structure 52-1 within fabric layer 46-2 that overlaps conductive pattern 54-1. Speaker unit 60-2 may include conductive pattern 54-2 within fabric layer 46-1 and magnetic structure 52-2 within fabric layer 46-2 that overlaps conductive pattern 54-2.

Boundaries between adjacent speaker units such as units 60-1 and 60-2 may be set by locations of attachment 62. At locations 62 along these boundaries, support layer 46-1 may be attached to support layer 46-2. In one illustrative arrangement described herein as an example, support layers 46-1 and 46-2 may be attached by stitching the two layers together along locations 62 defining the boundaries of speaker units 60 (e.g., defining the hexagonal boundaries in the example of FIG. 7). If desired, other mechanisms for attachment (e.g., via fusing by heat and/or pressure, via adhesive, etc.) may be used.

Configured in the manner described in connection with FIGS. 7 and 8, a speaker such as speaker 20 may include a plurality of independently operable speaker units (e.g., speaker domes), each of which can receive the same or different electrical audio signals. If desired, one or more speaker units may be differently sized or configured to be optimized for producing different types of audio output. If desired, one or more speaker units may be the same size or configuration to provide redundancy for each other and/or provide different directionality for audio output.

Figure 9:
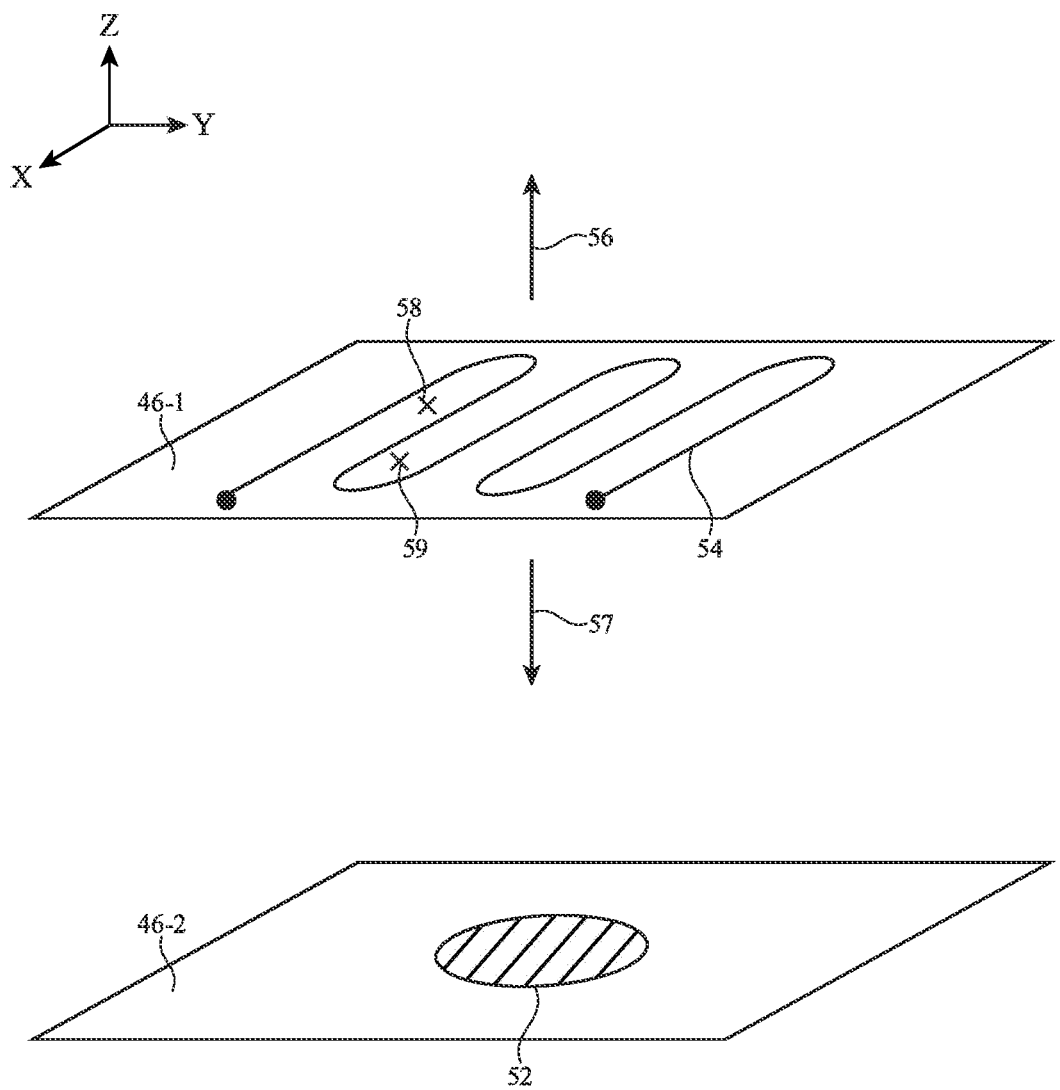
FIG. 9 is an exploded view of an illustrative speaker having a serpentine conductive pattern in accordance with some embodiments.

While some examples described in connection with FIGS. 2-8 refer to conductive pattern 30 or 54 as a conductive coil, this is illustrative of one of many possible implementations for a conductive pattern. FIG. 9 shows an illustrative conductive pattern 54 in a serpentine configuration. In the example of FIG. 9, conductive pattern 54 on support layer 46-1 may run along a meandering or serpentine path (e.g., be a meandering or serpentine conductive pattern) that extends across the plane of support layer 46-1.

The principles of actuating serpentine conductive pattern 54 and support layer 46-1 in FIG. 9 may be similar to those described in connection with coil 54 and support layer 46-1 in FIG. 3. In particular, an electrical current flowing along meandering conductive pattern (caused by the input of voltage signals at terminals at its two ends) in the presence of the magnetic field created by magnet 52 may cause a magnetic force that moves meandering conductive pattern 54 and support layer 46-1 in one or more directions (e.g., directions 56 and 57, a lateral direction, etc.), thereby causing pressure or sound waves.

However, whereas turns within a conductive coil structure (e.g., structure 54 in FIG. 3) run around a same principal (central) axis, turns and straight elongated portions within a serpentine conductive coil structure may run in different directions, thereby cause varying magnetic forces on meandering conductive structure 54 and support layer 46-1 in FIG. 9. As shown in FIG. 9, a first turn in conductive pattern 54 may be about a principal axis normal to point 58 on the surface of support layer 46-1, while a second turn in conductive pattern may be about a principal axis normal to point 59 on the surface of fabric layer 46-1. Accordingly, different types of movement (based on magnetic forces) may be caused on different portions of fabric layer 46-1, thereby producing different sound waves than a conductive coil structure.

The example of a meandering conductive pattern shown in FIG. 9 is also simply illustrative. If desired, any of the conductive structures 30 and 54 described herein (e.g., in connection with FIGS. 2-8) may be implemented based on any suitable patterns (e.g., coils, serpentine patterns, rectangular patterns, patterns with parallel lines, etc.) conducive to forming an electromagnet (through an electrical current flow) that can be actuated in the presence of magnetic structure 52.

Figure 10:
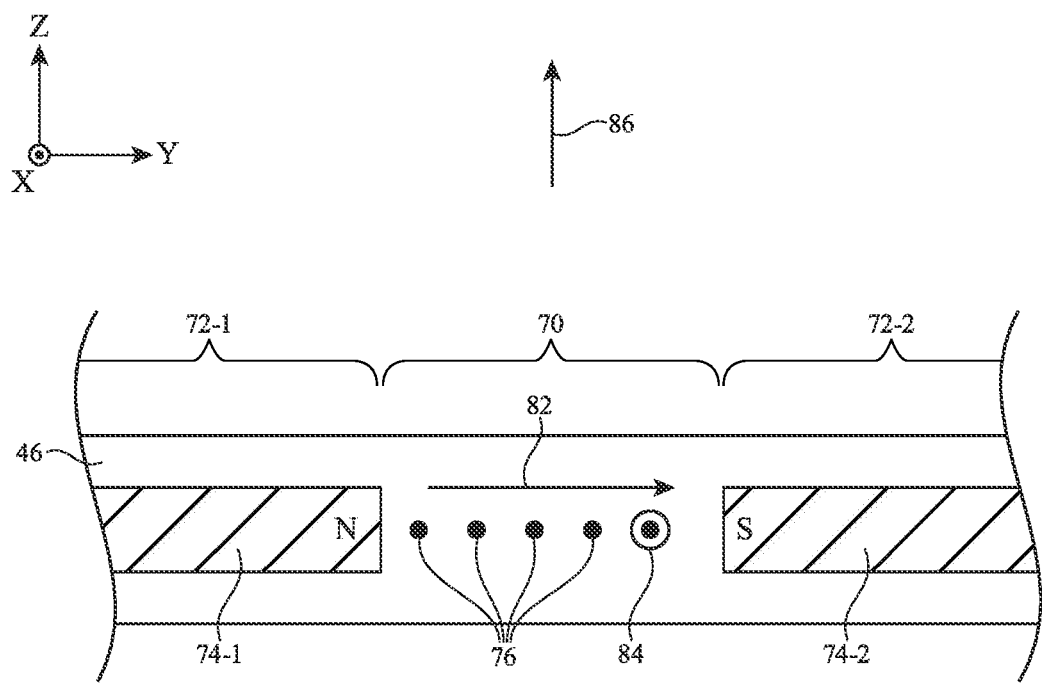
FIG. 10 is a cross-sectional side view of an illustrative fabric layer in which both a conductive pattern and magnetic structures are formed in accordance with some embodiments.

To form a more compact speaker, speaker components such as magnetic structure 32 and conductive pattern 30 may be formed on a single (fabric) support layer 46. FIG. 10 is a cross-sectional view of a single support layer 46 in which speaker components such as magnetic structures and conductive structures are included.

As shown in FIG. 10, support layer 46 (e.g., a fabric layer) may include a conductive pattern 76 such as a set of conductive lines extending along the x-dimension formed in region 70 within support layer 46. First and second magnetic structures 74-1 and 74-2 may be formed in regions 72-1 and 72-2, respectively, on opposing sides of conductive pattern 76. Magnetic structure 74-1 and 74-2 may each be formed from one or more permanent magnets. Magnetic structure 74-1 may have a north polarity (pole) facing a south polarity (pole) of magnetic structure 74-2. Configured in this manner, magnetic structures 74-1 and 74-2 may exhibit a magnetic field having magnetic field lines generally aligned with direction 82 (e.g., in the +y direction).

The set of conductive lines forming conductive pattern 76 may receive electrical signals that provide an electrical current in direction 84 (e.g., out of the page or in the +x direction). The direction of current flow in conductive pattern 76 within the magnetic field produced by magnetic structures 74-1 and 74-2 may cause region 70 (carried by conductive pattern 76) to exhibit upward force in direction 86. The opposite direction of current flow may cause a downward force in an opposite direction (e.g., −z direction). In such a manner, varied voltage signals (corresponding to electrical audio signals) received by conductive pattern 76 may cause movement (vibration) of layer 46 (e.g., at region 70), thereby displacing air and causing pressure or audio waves. In other words, selected regions of layer 46 such as region 70 may buckle and vibrate while other regions of layer 46 such as regions 72-1 and 72-2 may remain flat and still in response to the electrical audio signals.

Figure 11:
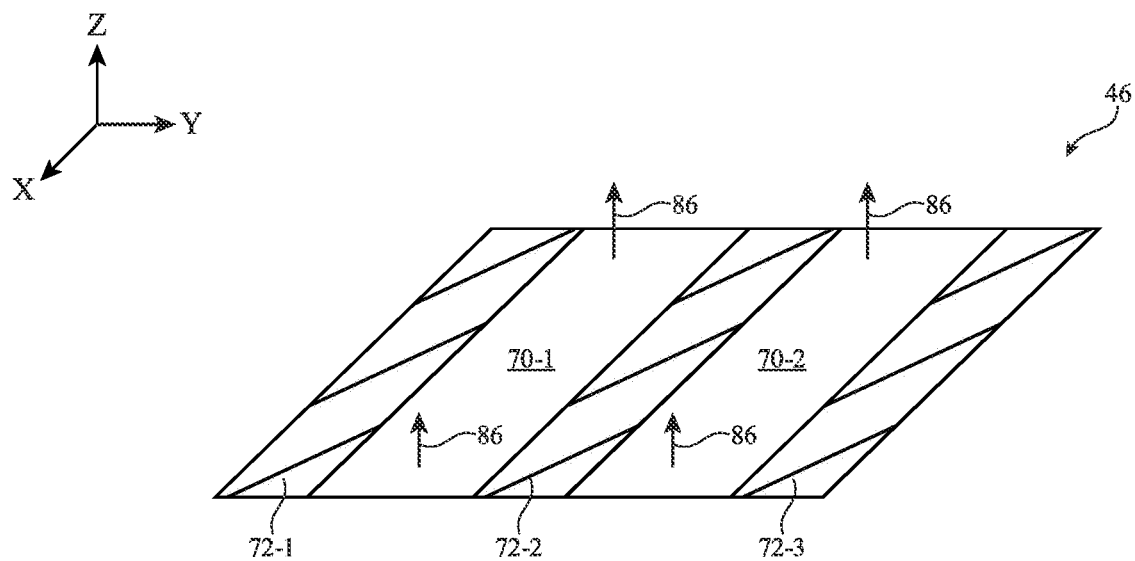
FIG. 11 is a perspective view of an illustrative fabric layer with rectangular regions having conductive patterns and magnetic structures in accordance with some embodiments.
Figure 12:
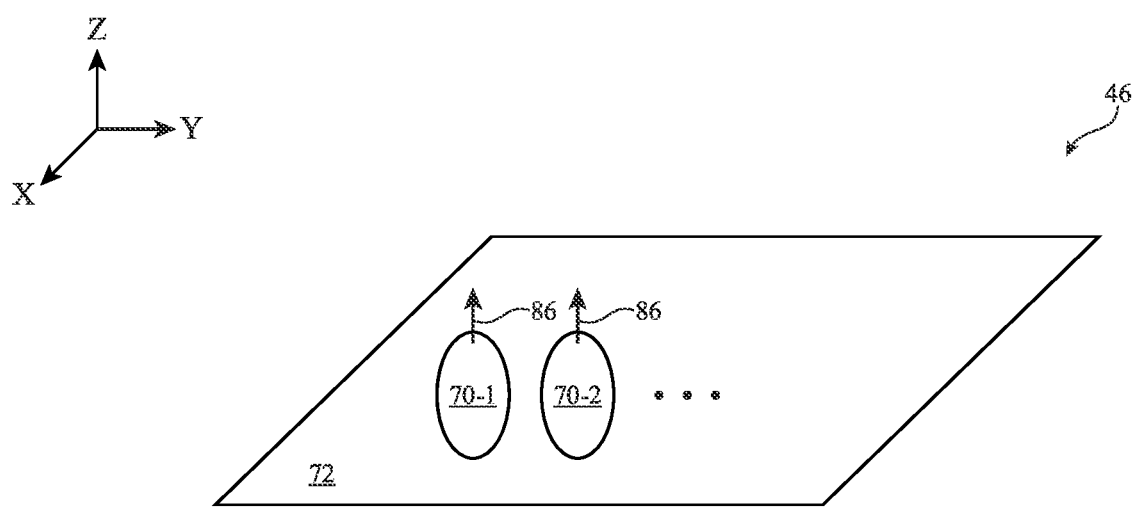
FIG. 12 is a perspective view of an illustrative fabric layer with circular regions of conductive patterns surrounded by magnetic structures in accordance with some embodiments.
Figure 13:
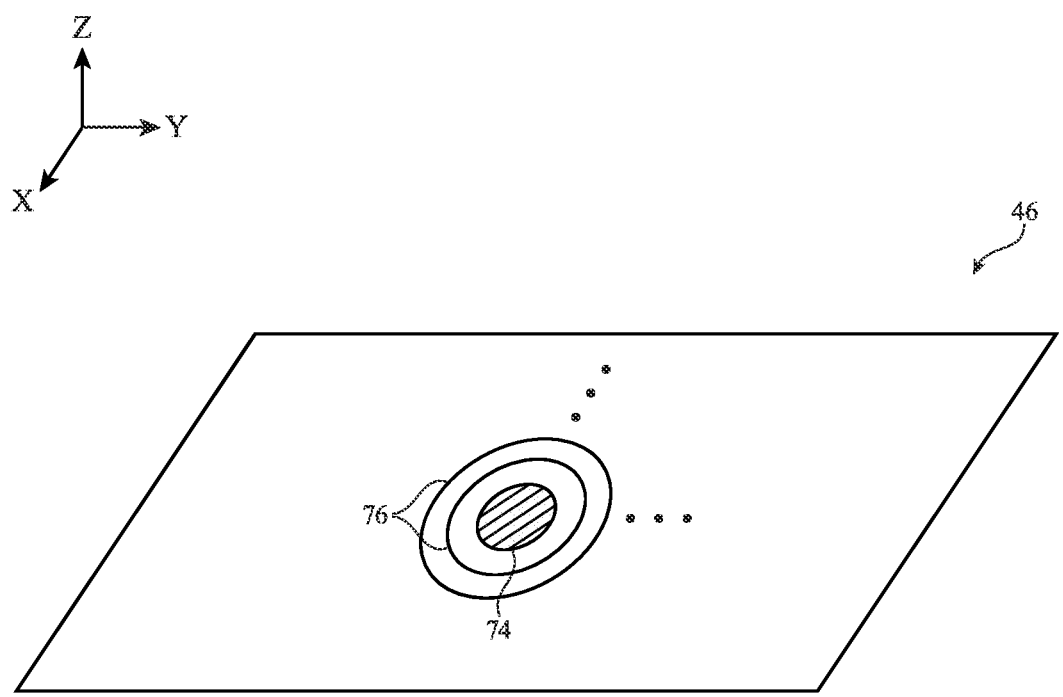
FIG. 13 is a perspective view of an illustrative fabric layer with magnetic structures surrounded by conductive patterns in accordance with some embodiments.

The single layer speaker structure operating based on the principles described in connection with FIG. 10 may be implemented with a number of different geometries for conductive structures and magnetic structures. FIGS. 11-13 show illustrative configurations of a single layer speaker structure configured to convert electrical signals into sound waves.

As shown in FIG. 11, support layer 46 (e.g., a fabric layer) may include rectangular regions 70 (e.g., a first region 70-1, a second region 70-2, etc.) containing conductive structures, each interposed between corresponding rectangular regions 72 (e.g., a first region 72-1, a second region 72-2, a third region 72-3, etc.) containing magnetic structures. In other words, each region 70 may be flanked on opposing sides by regions 72. Magnetic structures along an edge of region 72-1 facing region 70-1 may have a first pole facing conductive structures in region 70-1. and magnetic structure along an edge of region 72-2 facing region 70-1 may have a second pole (e.g., an opposite pole) facing conductive structures in region 70-1. Similarly, magnetic structures along an edge of region 72-2 facing region 70-2 may have a first pole facing conductive structures in region 70-2, and magnetic structure along an edge of region 72-3 facing region 70-2 may have a second pole (e.g., an opposite pole) facing conductive structures in region 70-2. Configured in this manner, electrical signals received through conductive structures in regions 70-1 and 70-2 may be converted to movement (e.g., vibrations) of rectangular regions 70-1 and 70-2 in direction 86 (and/or in the opposite-z direction or other directions).

As shown in FIG. 12, support layer 46 (e.g., a fabric layer) may include circular regions 70 (e.g., a first region 70-1, a second region 70-2, etc.) containing conductive structures, each surrounded by a continuous region (e.g., region 72) of layer 46 that include magnetic structures. If desired, these magnetic structures may have different poles on opposing sides of each circular region 70. In a similar manner described above, electrical signals received through conductive structures in regions 70-1 and 70-2 in the presence of a magnetic field created by different portions of magnetic structures in region 72 may be converted to movement (e.g., vibrations) of circular regions 70-1 and 70-2 in direction 86 (and/or in the opposite-z direction or other directions).

As shown in FIG. 13, support layer 46 (e.g., a fabric layer) may include circular (or non-circular) magnetic structures 74, each surrounded by circular (or non-circular) conductive lines or coil forming conductive pattern 76. In a similar manner described above, electrical signals received through conductive pattern 76 in the presence of a magnetic field created by different magnetic structures 74 may be converted to movement (e.g., vibrations) of portions of layer 46 in different directions (e.g., in +/−z directions or other lateral directions). In general, the poles of magnetic structures in different regions 74 may be configured to provide the desired magnetic field (lines) in the presence of which causes the desired movement when an electrical current is applied to conductive pattern 76.

FIGS. 11-13 are illustrative of some possible arrangements of conductive patterns and magnetic structures in a co-planar arrangement within a single support layer 46 such as a fabric layer. In general, magnetic structures in layer 46 may be arranged in any suitable pattern (e.g., have respective poles arranged in any suitable pattern) to provide the desired magnetic field lines. Based on these magnetic field lines, corresponding conductive patterns within the single support layer 46 may be actuated when there is current flow responsive to the application of electrical (audio) signals, thereby causing vibrations of the regions of layer 46 intercoupled with these conductive patterns and producing sound waves as speaker audio output.

Figure 14:
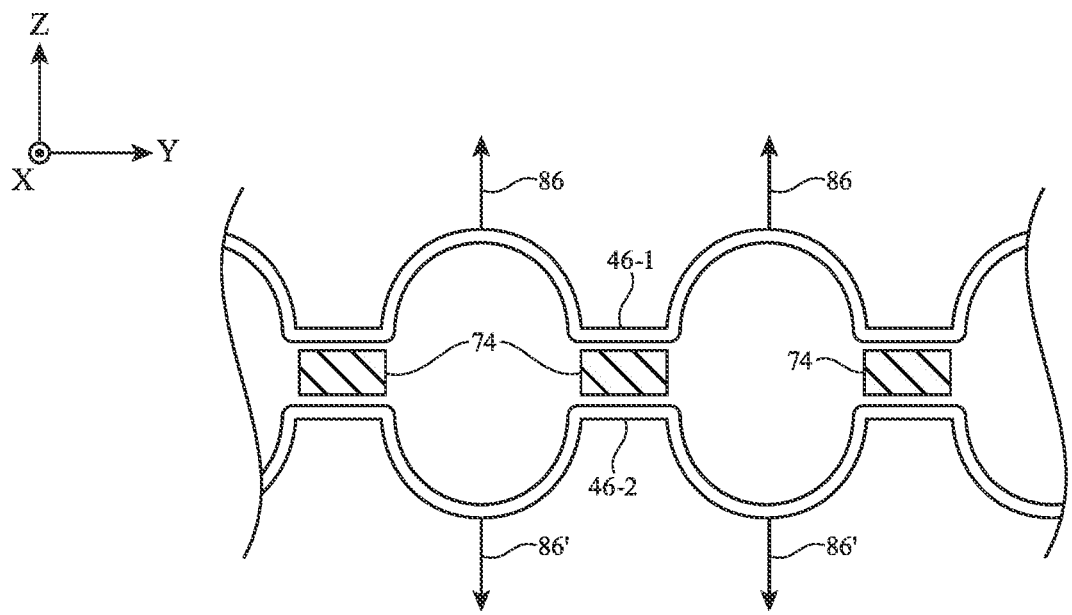
FIG. 14 is a cross-sectional view of multiple illustrative fabric layers of conductive patterns on opposing sides of magnetic structures in accordance with some embodiments.

If desired, a multi-layer support structure may also use the principles described in connection with FIGS. 10-13 to cause vibrations that produce sound waves. In particular, FIG. 14 shows an illustrative arrangement of multiple support layers that can exhibit localized motion in select regions. In the cross-sectional view of FIG. 14, two support layers 46-1 and 46-2 (e.g., fabric layers) may overlap each other. Magnetic structures 74 may be disposed between support layers 46-1 and 46-2 and/or attached to support layers 46-1 and 46-2. If desired, magnetic structures 74 may be incorporated in one or both of support layers 46-1 and 46-2 as described in connection with FIG. 10 and FIG. 6. Opposing edges of adjacent magnetic structure 74 may have opposite polarities to provide a suitable magnetic field (e.g., magnetic field lines having a desired general directionality).

Support layers 46-1 and 46-2 may include regions having conductive patterns flanked (or surrounded) by regions attached to or containing magnetic structures 74. When electrical signals are applied to these conductive patterns, these regions of support layers 46-1 and 46-2 may move along the vertical z-dimension (e.g., regions of support layer 46-1 containing conductive patterns may move in direction 86 (and/or in the −z or other directions) and regions of support layer 46-2 containing conductive patterns may move in direction 86' (and/or in the +z or other directions).

Figure 15:
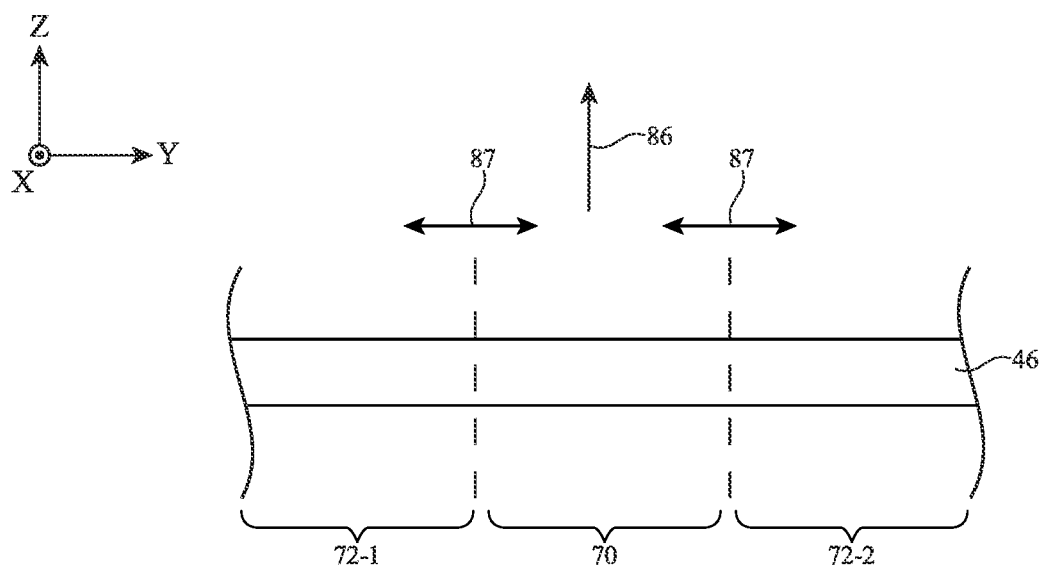
FIG. 15 is a cross-sectional view of an illustrative fabric layer having a stretchy region configured to exhibit lateral motion in accordance with some embodiments.

FIGS. 10-14 show magnetic and conductive structure configurations that are conducive to principal (primary) directions of movement along the vertical z-dimension. If desired, as shown in FIG. 15, one or more regions 70 of fabric layer 46 may be configured to move (e.g., stretch) in the lateral dimension (e.g., along the x- and/or y-dimensions). In particular, region 70 in FIG. 15 in which conductive patterns are formed may be formed from an elastic material that has restricted movement in direction 86 (and in the −z direction) but can stretch in lateral directions 87. Magnetic structures formed in regions 72-1 and 72-2 and/or in other overlapping fabric layers may create magnetic fields that actuate conductive patterns in region 70 to stretch along lateral directions such as directions 87. The stretching and un-stretching movement of region 70 may cause sound waves to produce speaker audio output.

Figure 16:
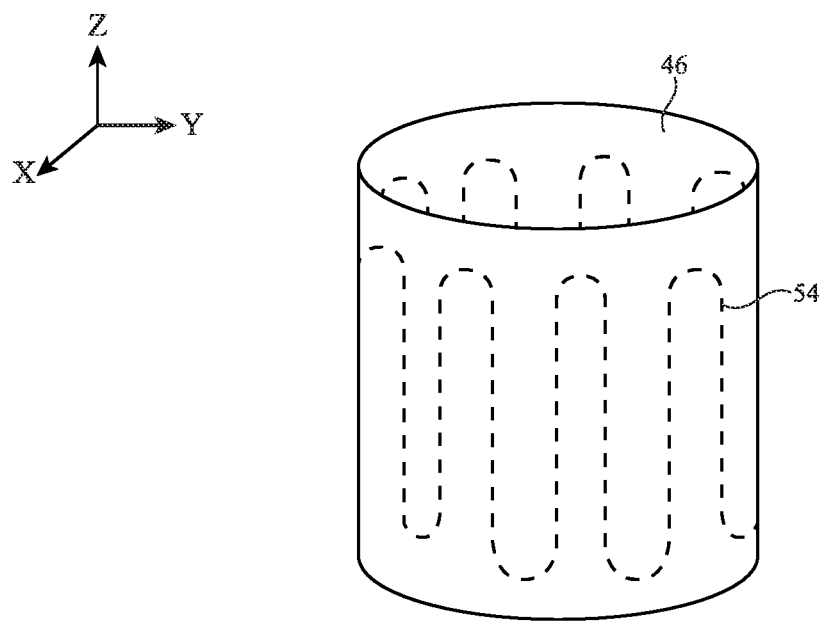
FIGS. 16 and 17 are perspective and cross-sectional views of an illustrative speaker having a three-dimensional fabric support structure with a conductive pattern surrounding a magnetic structure in accordance with some embodiments.
Figure 17:
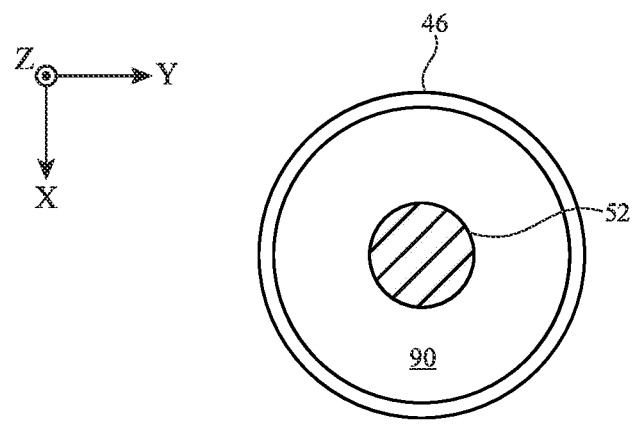

To provide speakers 20 for devices 10 having different form factors, it may be desirable to provide three-dimensional support structures for supporting three-dimensional speaker components. FIGS. 16 and 17 show an illustrative three-dimensional support structure such as support layer 46 (sometimes referred to as a support structure) on which conductive pattern 54 is formed. Support structure 46 may include fabric (e.g., a woven fabric, a knit fabric, etc.,) formed from natural materials such as cotton, wool, etc., conductive and non-conductive strands of material, may include a layer of suede fabric, felt, leather, etc., or other non-fabric materials such as polymers, metals, dielectrics, ceramics, etc. Configurations in which support structure 46 is a fabric-based support structure (sometimes referred to herein as fabric support structure) are described herein as an illustrative example. Fabric support structure 46 may have a tubular or ring shape. In particular, support structure 46 may have a lateral area surrounding (running around) a central axis and have an inner surface facing the central axis. The inner surface may define an interior opening of support structure 46.

Conductive pattern 54, such as a meandering pattern as shown in FIG. 16, may be incorporated into support structure 46 (e.g., may be incorporated into the fabric of support structure 46 during the fabrication process, may be adhered or otherwise attached to support structure 46, etc.). While a meandering pattern for conductive pattern 54 is shown in the example of FIG. 16, if desired, conductive pattern 54 may be a coil pattern, a plurality of parallel and/or non-parallel lines, or any other suitable pattern.

A cross-sectional view of support structure 46 is shown in FIG. 17. Magnetic structure 52 such as a permanent magnet may be disposed in interior opening 90 of support structure 46. Configured in this manner, magnetic structure 52 may be surrounded by conductive pattern 54 and support structure 46. In some arrangements, support structure 46 may further be tightened to close (e.g., remove) interior opening 90 such that magnetic structure 52 is fully and tightly enclosed by support structure 46 and therefore surrounded by conductive structure 54 (e.g., on top and bottom sides in addition to on the peripheral sides).

Figure 18:
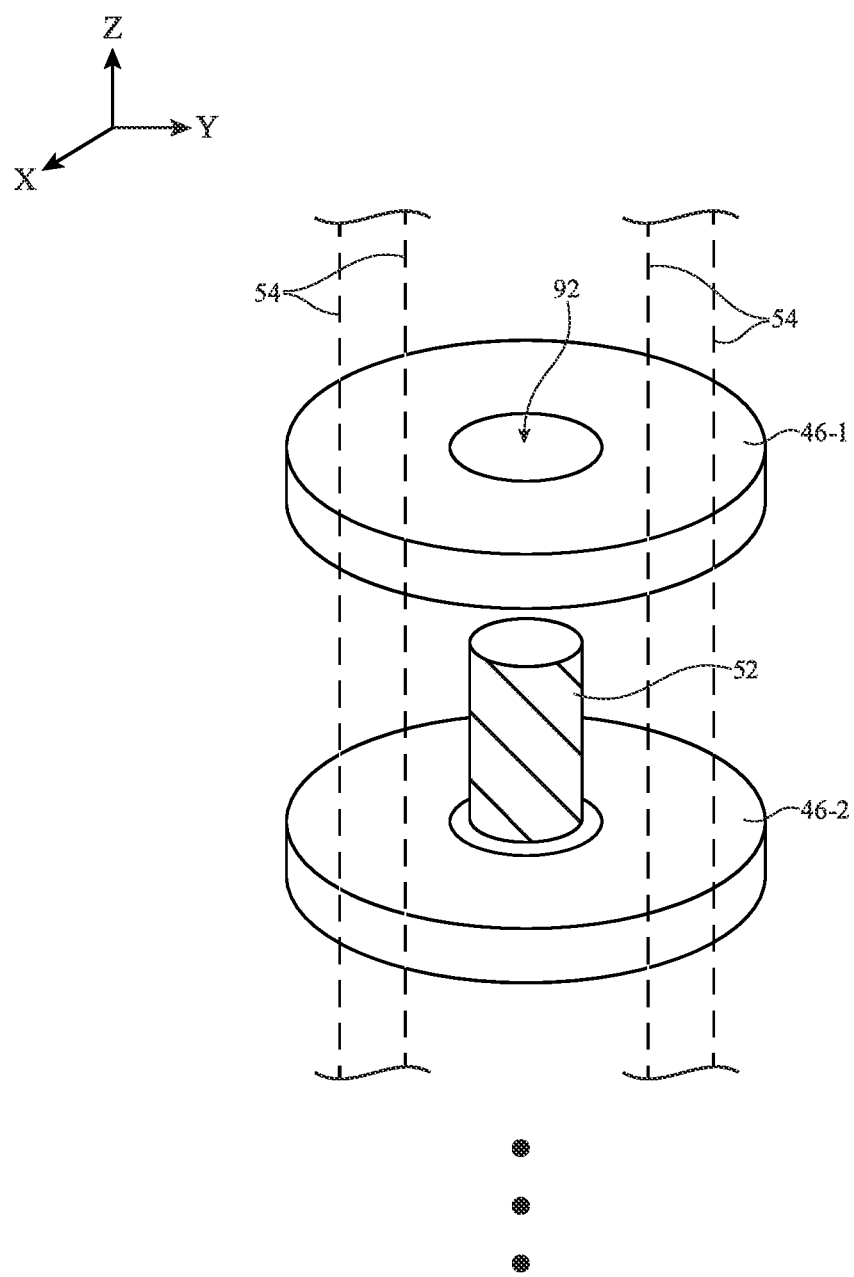
FIG. 18 is a perspective exploded view of an illustrative speaker having multiple fabric layers tied together with one or more conductive strands forming a conductive pattern in accordance with some embodiments.

FIG. 18 is an exploded view of an illustrative three-dimensional speaker structure having multiple parallel support layers tied together with one or more strands of conductive material. As shown in FIG. 18, any suitable number of parallel planar support layers 46 (e.g., a first support layer 46-1, a second support layer 46-2, etc.) may be provided. Each support layer 46 (e.g., formed from a fabric layer) may be ring-shaped and have an inner opening 92 aligned with one another. One or more magnetic structures 52 may be disposed within the set of openings 92. One or more strands of conductive material forming conductive pattern 54 may tie and hold support layers 46 together to enclose the one or more magnetic structures, when tightened.

Although four distinct strands of conductive material are shown in FIG. 18, the four and any additional strands of conductive material may be connected to each other at the topmost support layer 46 and the bottommost support layer 46 of the three-dimensional structure (e.g., four segments of a single continuous serpentine strand of conductive material are shown in FIG. 18). If desired, separate disconnected strands of conductive material may tie and hold support layers 46 together. The strands of conductive material may compress the multiple fabric layers 46 together to surround magnetic structures 52. When fabric layers 46 are in this compressed state, the strands of conductive material forming conductive pattern 54 may surround magnetic structure 52

(e.g., similar to the configuration of conductive pattern 54 with respect to magnetic structure 52 as described in connection with FIGS. 16 and 17).

Conductive pattern 54 as described in connection with FIGS. 16-18 may include terminals for receiving electrical signals that produce an electrical current flow on conductive pattern 54. The current flow in the presence of the magnetic field created by magnetic structure 52 may cause one or more regions (e.g., all regions) of the three-dimensional support structure 46 to move (e.g., vibrate) in a similar manner as described in connection with FIGS. 2-15. Because conductive pattern 54 and support structure 46 surround one or more magnetic structures 52 on multiple sides (e.g., on peripheral sides, on all sides, etc.), the vibration of support structure 46 may be on multiple sides, thereby producing sound waves on multiple sides. As such, a speaker formed using the three-dimensional support structures 46 described in connection with FIGS. 16-18 may produce audio output in multiple directions such as in opposite directions (e.g., may produce omni-directional sound).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A speaker comprising:
a first fabric layer;
a second fabric layer overlapping the first fabric layer;
a magnetic structure supported by the second fabric layer; and
a conductive pattern that is on the first fabric layer and that overlaps the magnetic structure, wherein the conductive pattern is configured to receive electrical signals and wherein the first fabric layer is configured to move based on the electrical signals.

2. The speaker defined in claim 1, wherein the conductive pattern comprises a conductive coil having first and second voltage terminals configured to receive the electrical signals, wherein the conductive coil is formed from one or more strands of conductive material within the first fabric layer, and wherein the magnetic structure comprises magnetic material formed within the second fabric layer.

3. The speaker defined in claim 1, wherein the magnetic structure is disposed between the first fabric layer and the second fabric layer.

4. The speaker defined in claim 3, wherein the conductive pattern comprises a pattern selected from the group consisting of a coil pattern, a serpentine pattern, and a pattern of parallel lines.

5. The speaker defined in claim 1 further comprising:
a third fabric layer, wherein the conductive pattern is disposed between the first fabric layer and the third fabric layer, wherein the first fabric layer overlaps the second fabric layer, and wherein the second fabric layer overlaps the third fabric layer.

6. The speaker defined in claim 1 further comprising:
a third fabric layer; and
an additional conductive pattern on the third fabric layer, wherein the second fabric layer is between the first fabric layer and the third fabric layer.

7. The speaker defined in claim 6 further comprising:
additional magnetic structures, the magnetic structure and the additional magnetic structures forming an array of magnetic structures that overlaps the conductive pattern and the additional conductive pattern.

8. The speaker defined in claim 1, wherein the conductive pattern and the magnetic structure form a speaker unit and wherein the speaker comprises a plurality of additional speaker units each including an additional conductive pattern on the first fabric layer and an additional magnetic structure on the second fabric layer.

9. The speaker defined in claim 8, wherein the speaker unit has a boundary with an adjacent speaker unit in the plurality of additional speaker units and wherein the first fabric layer is attached to the second fabric layer along the boundary.

10. The speaker defined in claim 1, wherein at least one of the first and second fabric layers comprises a fabric layer formed from suede, a woven fabric portion, or a knit fabric portion.

11. A speaker comprising:
a fabric layer;
magnetic structures disposed within the fabric layer; and
conductive structures disposed within the fabric layer and configured to receive electrical signals, wherein a portion of the fabric layer in which the conductive structures are disposed is configured to move based on the electrical signals.

12. The speaker defined in claim 11, wherein the magnetic structures comprise first and second magnets, and the conductive structures are disposed between the first and second magnets.

13. The speaker defined in claim 12, wherein the first magnet has a first side facing the second magnet, wherein the first side of the first magnet has a first polarity, wherein the second magnet has a second side facing the first magnet, and wherein the second side of the second magnet has a second polarity opposite the first polarity.

14. The speaker defined in claim 13, wherein the conductive structures are disposed in a first region of the fabric layer, wherein the first and second magnetic structures are disposed in second regions of the fabric layer, and wherein the first region is configured to buckle in response to audio signals received at the conductive structures.

15. The speaker defined in claim 14, wherein the first region is a rectangular region that is flanked on opposing sides by the second regions.

16. The speaker defined in claim 14, wherein the first region is a circular region that is surrounded by the second regions.

17. The speaker defined in claim 11, wherein the conductive structures surround the magnetic structures.

18. A fabric-based item comprising:
a fabric support structure;
a conductive pattern on the fabric support structure having first and second terminals configured to receive electrical signals; and
a magnetic structure, wherein the conductive pattern and the fabric support structure both surround the magnetic structure and wherein the fabric support structure is configured to move based on the electrical signals.

19. The fabric-based item defined in claim 18, wherein the fabric support structure has a tubular shape with a lateral area and an interior opening, wherein the conductive pattern extends across the lateral area, and wherein the magnetic structure is disposed within the interior opening.

20. The fabric-based item defined in claim 18, wherein the fabric support structure comprises a plurality of fabric layers having an inner opening, wherein the magnetic structure is disposed within the inner opening, and wherein the conductive pattern comprises one or more strands of conductive material that extend through each fabric layer in the plurality of fabric layers.

* * * * *